US00RE45611E

(19) United States
(12) Reissued Patent
Haley

(10) Patent Number: US RE45,611 E
(45) Date of Reissued Patent: Jul. 14, 2015

(54) REUSABLE BOTTLE STOPPER

(71) Applicant: Vinum Corporation, Oak Brook, IL (US)

(72) Inventor: James E. Haley, Oak Brook, IL (US)

(73) Assignee: Vinum Corporation, Oak Brook, IL (US)

(21) Appl. No.: 14/163,010

(22) Filed: Jan. 24, 2014

Related U.S. Patent Documents

Reissue of:
(64) Patent No.: 8,123,086
Issued: Feb. 28, 2012
Appl. No.: 10/786,732
Filed: Feb. 25, 2004

(51) Int. Cl.
*B67D 3/00* (2006.01)
*B65D 47/06* (2006.01)
*B65D 51/24* (2006.01)

(52) U.S. Cl.
CPC ..... *B65D 47/06* (2013.01); *B65D 51/24* (2013.01)

(58) Field of Classification Search
CPC ..... B65D 39/00; B65D 39/0005; B65D 2539/003; B65D 39/0017; B65D 39/0029; B65D 47/043; B65D 47/06; B65D 47/08; B65D 47/0804; B65D 47/0828; B65D 47/0833; B65D 47/0838; B65D 47/0842; B65D 47/121; B65D 47/14; B65D 47/141; B65D 47/42; B65D 51/16; B65D 51/24; B65D 51/245; B65D 2205/00
USPC ..... 222/565, 575, 189.06, 189.9, 189.1, 222/543, 569–571, 562, 545, 547, 478–488, 222/517; 215/309, 230, 308, 355, 364
See application file for complete search history.

(56) References Cited

U.S. PATENT DOCUMENTS

| | | | | | |
|---|---|---|---|---|---|
| 62,333 | A | * | 2/1867 | Holl | 215/308 |
| 489,637 | A | * | 1/1893 | von Hirsch | 215/309 |
| 1,087,758 | A | | 2/1914 | Goodwin | |
| 1,164,453 | A | | 12/1915 | Belles | |
| 1,213,319 | A | * | 1/1917 | Whitaker | 215/364 |
| 1,458,004 | A | * | 6/1923 | Robinson | 215/309 |
| 1,966,611 | A | * | 7/1934 | Cobel | 222/189.07 |
| 2,812,113 | A | * | 11/1957 | Beall, Jr. | 222/111 |

(Continued)

FOREIGN PATENT DOCUMENTS

EP 0 011 278 A1 5/1980

OTHER PUBLICATIONS

European Patent Office, Supplementary European Search Report, European Patent Application No. EP 04782356.2, Jun. 29, 2011.

*Primary Examiner* — Patrick M Buechner
(74) *Attorney, Agent, or Firm* — Hinshaw & Culbertson LLP

(57) ABSTRACT

A bottle stopper is provided having a cylindrical body formed of a resilient, flexible, elastic material that includes a first cylindrical section adapted to be inserted into an opening of a bottle in sealing engagement with the bottle and a second cylindrical section disposed adjacent the first cylindrical section for extending above the opening of the bottle when the first cylindrical section is inserted in sealing engagement with the bottle. An air passageway is disposed adjacent and extends longitudinally along substantially at least the length of the first cylindrical section and along the internal periphery of the cylindrical body. A visual indicator, preferably a spout, is disposed on an outer surface of the second cylindrical section for identifying the relative location of the air passageway with respect to the visual indicator.

38 Claims, 3 Drawing Sheets

(56) References Cited

U.S. PATENT DOCUMENTS

| | | | | | |
|---|---|---|---|---|---|
| 2,872,060 | A | | 2/1959 | Brune et al. | |
| 2,915,223 | A | * | 12/1959 | Beall, Jr. | 222/109 |
| 2,968,423 | A | * | 1/1961 | Mahler et al. | 222/49 |
| 3,081,912 | A | * | 3/1963 | Goceliak | 222/189.07 |
| 3,168,221 | A | * | 2/1965 | Parker | 222/109 |
| 3,283,964 | A | * | 11/1966 | Anderson | 222/487 |
| 3,307,752 | A | * | 3/1967 | Anderson | 222/465.1 |
| 3,323,691 | A | * | 6/1967 | Ruetz | 222/421 |
| 3,330,450 | A | * | 7/1967 | Clare | 222/479 |
| 3,628,697 | A | * | 12/1971 | Dowson | 222/111 |
| 3,762,612 | A | * | 10/1973 | Miller | 222/479 |
| 3,926,348 | A | * | 12/1975 | Lutzker | 222/189.07 |
| 4,078,700 | A | * | 3/1978 | Hidding | 222/109 |
| 4,128,189 | A | * | 12/1978 | Baxter | 222/109 |
| 4,243,157 | A | * | 1/1981 | Rettberg | 222/44 |
| D261,212 | S | | 10/1981 | Mills | |
| 4,345,704 | A | * | 8/1982 | Boughton | 224/414 |
| 4,347,946 | A | * | 9/1982 | Nichols | 220/375 |
| 4,398,652 | A | * | 8/1983 | Ueda et al. | 222/1 |
| 4,605,225 | A | | 8/1986 | Zimmermann | |
| 4,637,530 | A | * | 1/1987 | Jiang | 222/564 |
| D296,524 | S | | 7/1988 | Schneider | |
| D318,427 | S | | 7/1991 | Sherburne, Jr. | |
| 5,228,603 | A | * | 7/1993 | Pham et al. | 222/479 |
| 5,417,860 | A | * | 5/1995 | Kay | 210/472 |
| 5,609,759 | A | | 3/1997 | Nohren, Jr. et al. | |
| 5,616,242 | A | | 4/1997 | Mandola | |
| 5,688,397 | A | | 11/1997 | Malmborg | |
| 5,799,836 | A | * | 9/1998 | Lee | 222/189.07 |
| D404,646 | S | | 1/1999 | Black, Sr. et al. | |
| D418,417 | S | | 1/2000 | Hollinger | |
| D437,782 | S | | 2/2001 | Haley et al. | D9/440 |
| D464,262 | S | | 10/2002 | Drennow | |
| 6,565,743 | B1 | | 5/2003 | Poirier et al. | |
| D487,227 | S | | 3/2004 | Haley | |
| 6,742,678 | B1 | * | 6/2004 | Krystopik, Jr. | 222/481.5 |

* cited by examiner

REUSABLE BOTTLE STOPPER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The present invention relates to a bottle stopper, and more particularly to a bottle stopper having an air passageway and a visual indicator to identify the relative location of the air passageway with respect to the visual indicator.

BACKGROUND OF THE INVENTION

The importance of properly "stopping" or providing a resealable stopper for opened bottles, such as wine bottles, is well known. Contact with air is the primary cause of wine spoilage. In particular, oxygen enables organisms to grow on the surface of the wine which may produce undesirable flavors and aromas. Further, oxygen may also trigger chemical reactions that lead to flavor losses and color changes in the wine.

A number of bottle stoppers are known. Bottle stoppers that provide for an airtight seal for contents within a bottle usually need to be removed before pouring the contents from the bottle. This causes a hindrance for many individuals, especially bartenders, servers, and others who repeatedly pour from bottles because they must remove the bottle stopper each time they pour the contents from the bottle. Besides pulling the stopper out of the bottle, they must set it aside in a sanitary place, and then re-insert the stopper in order to once again preserve the contents. All of these extra steps require additional time, and there is a risk of contamination of both the stopper and the contents within the bottle. Bartenders often have limited time and handling a bottle stopper that needs to be completely removed wastes time.

When pouring from an open wine bottle, the presentation of the bottle and subsequent pouring of the wine must be aesthetically pleasing, especially in a formal setting. This means the flow from the bottle should be smooth and even, and the contents of the bottle should not spill or drip down the side of the bottle. Without aid, it is difficult to pour the contents of the bottle without dripping any portion thereof on the surface below, such as a white tablecloth. At a finer restaurant, and with red wine, this would be extremely undesirable. Some servers often rotate the bottle as they pour in an attempt to keep the contents from dripping. Further, other servers often use a white handkerchief to prevent the contents from dripping on the surface below. The manual method is ineffective to stop dripping, and the use of a new white handkerchief requires regular cleaning, regular replacement, and thus extra cost and time.

Additionally, after an original cork is removed from a bottle, for example, such as a wine bottle, pieces of the cork remain within the bottle. Then, when the wine is poured from the bottle, cork pieces may also be dispersed. Other times, there is sediment inside a wine or other bottle. These situations are unappetizing to wine drinkers and also interfere with the distinct aromas and tastes that accompany each specific wine.

A need therefore exists for an improved reusable bottle stopper that can be economically fabricated and that provides one or more of the foregoing features.

BRIEF SUMMARY OF THE INVENTION

In accordance with the present invention, a bottle stopper device is provided that enables a smooth, uniform pouring from a bottle and the preservation of its contents. The bottle stopper device is composed of a cylindrical body formed of a flexible, elastic and resilient material. The cylindrical body has a first end, a second end, a first cylindrical section having a length, and a second cylindrical section having a length. The first end and the first cylindrical section are adapted to be inserted into an opening of a bottle in sealing engagement with the bottle. The second cylindrical section is disposed adjacent the first cylindrical section and extends above the opening of the bottle when the first cylindrical section is inserted in sealing engagement with the bottle.

In accordance with one aspect of the invention, an air passageway is disposed adjacent and extends longitudinally along substantially at least a length of the first cylindrical section and along the internal periphery of the cylindrical body. The air passageway permits the flow of air into the bottle while the contents of the bottle are being poured from the bottle. Thus, the air passageway enables a smooth, even flow of the contents of the bottle.

In one embodiment, the air passageway extends longitudinally along at least the length of the first cylindrical section when the first cylindrical section is inserted in sealing engagement with the bottle. In another embodiment, the passageway extends longitudinally at least ½" past the length of the first cylindrical section when the first cylindrical section is inserted in sealing engagement with the bottle. Further, the air passageway may be of such a size as to extend to a lower portion of the bottle, and can be seven or eight inches, or more, if desired.

In accordance with another aspect of the invention, the cylindrical body includes a visual indicator disposed on an outer surface of the cylindrical body for identifying the relative location of the air passageway with respect to the visual indicator. The visual indicator enables the user to identify the respective location of the air passageway and to pour the contents of the bottle with the air passageway maintained in an upwardly facing or top position of the bottle such that the air passageway remains free or substantially free of liquid during pouring so that air can enter the bottle through the air passageway as the liquid contents of the bottle are poured out of the bottle. When the air passageway is maintained in such an upwardly facing position, the contents of the bottle will pour with a smooth, even flow.

In a preferred embodiment, the visual indicator includes a spout, and preferably an anti-drip spout, which is positioned on the second end and on the second cylindrical section. However, the visual indicator may alternatively be a protuberance, an indentation, a marking having a different color from the color of the cylindrical body, or any other suitable structure for identifying the orientation of said air passageway with respect to said indicator. The visual indicator is preferably radially spaced from the air passageway by at least about 120°, and more preferably about 180°, but may be radially spaced from the air passageway as desired. For example, the visual indicator may be radially spaced from the air passageway by about 90°.

In accordance with one aspect of the invention, the bottle stopper device is a combination bottle stopper and filter device and further includes a filter that is disposed within and integrally formed within said cylindrical body. The integral filter can have openings sized as desired so that, for example, the desired materials that may be present in the liquid in the bottle are filtered out, such as pieces of cork, wine sediment, and titrates.

In accordance with another aspect of the invention, the bottle stopper and filter device are formed by injection molding. Thus, it is contemplated that the filter will be of the same material as the cylindrical body. However, even if injection molded, the filter, although integrally formed with the cylindrical body, can be of a different material if desired. This could be accomplished during the injection molding process by controlling the flow of material that forms the filter portion of the device.

In accordance with another aspect of the invention, the bottle stopper device includes a cap that is insertable in sealing engagement over the second end of the cylindrical body. The cap may be integrally attached to the cylindrical body by means of a strand of material. This prevents the cap from being misplaced when the cap is in the open position. Additionally, the cap may be attached to the cylindrical body by a hinge. Further, the cap may be separate and removably attachable to the cylindrical body by a snap-fit or frictional-fit closure. The cap may be constructed of the same material as the cylindrical body, which can be a rigid or flexible material, such as plastic or rubber, for example, preferably of a food-grade quality.

In one embodiment, where the visual indicator is a spout and the bottle stopper device includes a cap, the cap has an overlapping longitudinal extent that overlaps with the second end when in sealing engagement therewith. More particularly, the spout has a longitudinal extent less than the overlapping longitudinal extent of the cap such that the cap overlaps the mouth of the spout to prevent air from entering the bottle through the spout when the first cylindrical section is in sealing engagement with the bottle and the cap is in sealing engagement with the second cylindrical section.

In accordance with another aspect of the present invention, one of the cap and the cylindrical body, and preferably the cap, has an integral circumferential sealing ring and the other of the cap and cylindrical body has a circumferential sealing groove complementary to the sealing ring. It is important that the spout is located above the circumferential sealing ring and groove as shown in FIGS. 1-6 such that the cap is sealed below the spout. The cap is preferably integrally attached to the cylindrical body by a flexible strand of material extending from the cylindrical body to the cap at a predetermined location on the circumference of the cylindrical body and radially spaced at least about 120° from the spout, and more preferably about 180°, but may be radially spaced from the air passageway as desired. For example, the strand may be radially spaced from the cylindrical body by about 90°. Alternatively, the cap may be attached to the cylindrical body by any suitable structure.

In accordance with another aspect of the invention, a method is provided for pouring contents from a bottle. The method comprises inserting a bottle stopper into a bottle, the bottle stopper having a visual indicator, verifying a location on the cylindrical body of the visual indicator and the relative location of the air passageway relative to the visual indicator; and pouring contents from the bottle such that the air passageway of the bottle stopper device is maintained in a relatively upward facing position of the bottle.

In accordance with another aspect of the invention, a method is provided for manufacturing a bottle stopper device for use with a bottle comprising: providing a cylindrical body formed of a flexible, elastic, resilient material and having a first end, a second end, a first cylindrical section, and a second cylindrical section; providing the first cylindrical section with a length which is adapted to be inserted into an opening of a bottle in sealing engagement with the bottle; providing the second cylindrical section with a length and disposing the second cylindrical section adjacent the first cylindrical section such that the second cylindrical section extends above the opening of the bottle when the first cylindrical section is inserted in sealing engagement with the bottle; providing an air passageway disposed adjacent and extending longitudinally along substantially at least the length of the first cylindrical section and along the internal periphery of the cylindrical body; and providing a visual indicator disposed on an outer surface of the second cylindrical section for identifying the relative location of the air passageway with respect to the visual indicator.

DETAILED DESCRIPTION OF THE INVENTION

In accordance with the present invention, a bottle stopper device is provided which enables the contents of a bottle, preferably a wine bottle, to be poured with a smooth, even flow without any dripping of the contents of the bottle. Additionally, the bottle stopper device in accordance with the invention enables the contents of an opened bottle to be preserved while substantially preventing air from flowing into the bottle which could undesirably affect the color, taste, and texture of the bottle contents.

Figure 1:
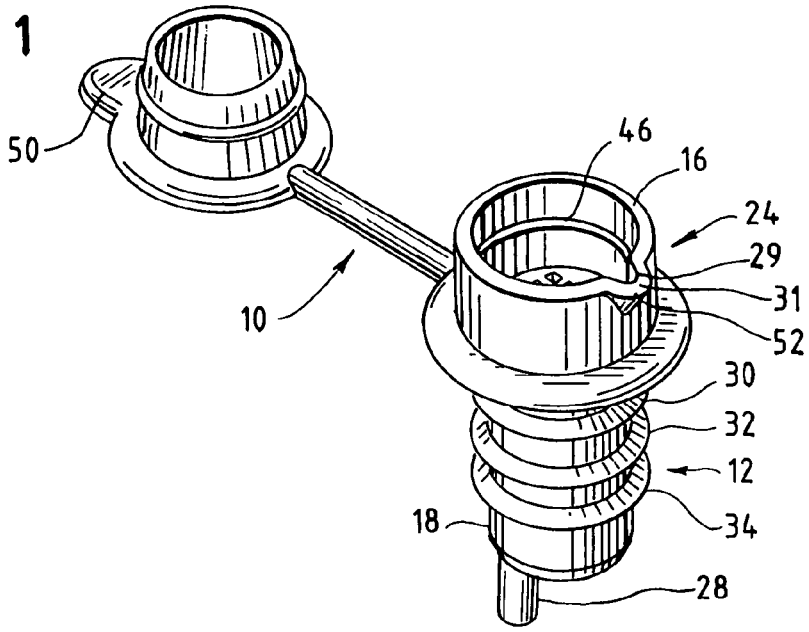
FIG. 1 illustrates a perspective view of a device in accordance with the present invention in an open position.

Bottle stopper device 10 is shown generally in FIG. 1 and includes a cylindrical body 12 that includes first and second ends 14 and 16, respectively. First end 14 is adapted to be inserted, along with at least a portion of a first cylindrical section 18, into an opening of a bottle B in sealing engagement therewith as shown in FIG. 2.

Figure 2:
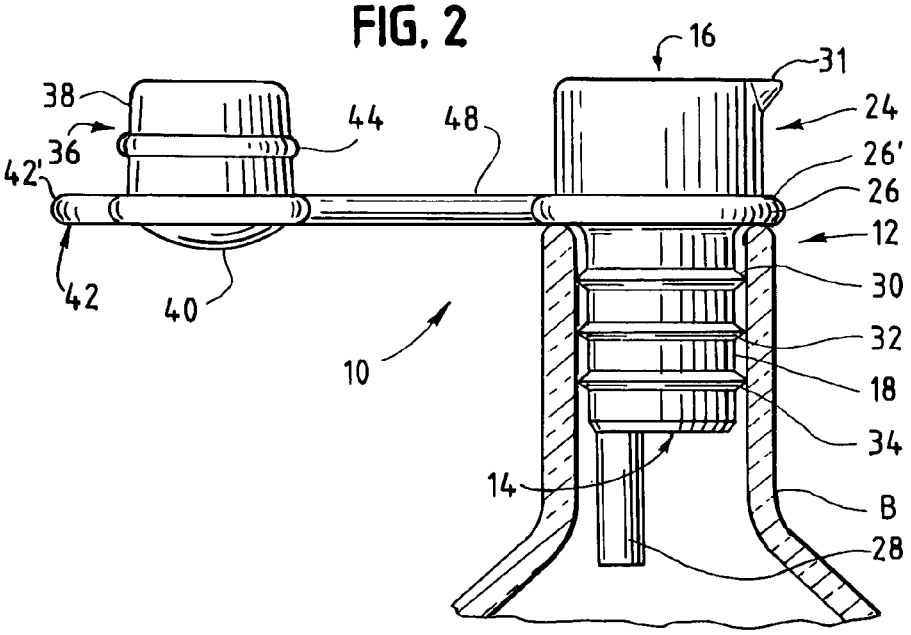
FIG. 2 illustrates a side elevation view of the device of FIG. 1.

Cylindrical body 12 further includes a second cylindrical section 24 adjacent first cylindrical section 18 which extends above the opening of bottle B when first cylindrical section 18 is inserted in sealing engagement in the bottle as is also shown in FIG. 2. The height that the device extends above the bottle is relatively small, typically about 0.75 inches above the top edge of the bottle. This allows for handy storage inside a refrigerator, typically without requiring an increased shelf height. Preferably, cylindrical body 12 also includes a circumferential shoulder 26 that abuts the top edge of bottle B when device 10 is inserted therein. Circumferential shoulder 26 thus provides a visual indication when device 10 is fully inserted into the opening of bottle B.

Cylindrical body 12 is preferably composed of a flexible, elastic and resilient material. Further, bottle stopper device 10 may be constructed entirely of the same material, which can be a material that is approved by the FDA for contact with food, including beverages such as wine, for example. In addition, the material can be chosen so that it does not absorb or impart any odor to or from the contents of the bottle. This is particularly advantageous for use with wine in general and in particular premium wine.

Figure 3:
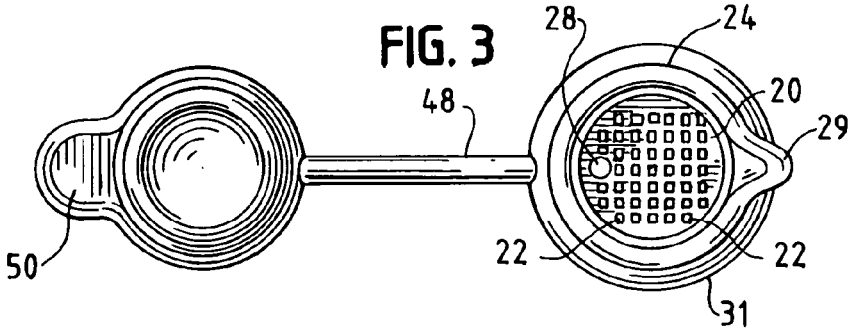
FIG. 3 illustrates a top view of the device of FIG. 1.

Preferably, cylindrical body 12 includes a filter 20, as shown in FIG. 3. Filter 20 is integrally formed as part of cylindrical body 12, as is also best shown in FIG. 3. As illustrated, filter 20 is composed of a plurality of small square apertures 22. Apertures 22 are dimensioned as desired and as illustrated are about 0.04 inches on a side. Apertures 22 can be any size and shape as desired. For example, apertures 22 may be round, oval or rectangular or any other shape as desired. Apertures 22 may be smaller than as illustrated in FIG. 3, for example, particularly if it is desired to filter smaller particles. For example, apertures 22 may be 0.03, 0.02 or 0.01 inches or any size larger, as desired. Preferably, filter 20 is located at an elevation equal to the location of circumferential shoulder 26, as advantageously illustrated in FIG. 2, for example. Circumferential shoulder 26 may have a rounded outer edge 26'.

Preferably, cylindrical body 12 also includes at least one and preferably a plurality, of circumferential sealing rings 30, 32 and 34 that are disposed on the outer surface of first cylindrical section 18, as shown in FIG. 2. Circumferential sealing rings 30-34 are constructed of the same material as cylindrical body 12 and thus help provide a liquid leak-proof and airtight seal between cylindrical body 12 and bottle B as illustrated in FIG. 2. Because the material of construction of device 10 is preferably flexible, elastic, and resilient, circumferential sealing rings 30-34 are easily deformed to provide the desired seal when device 10 is inserted into the end of a bottle.

Figure 4:
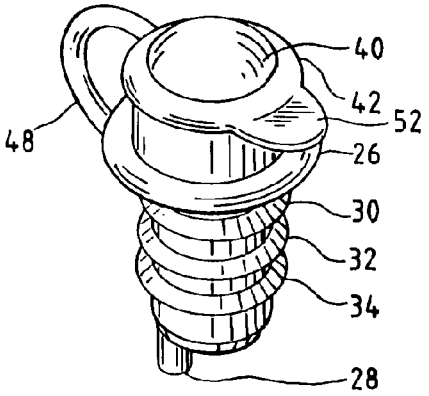
FIG. 4 illustrates a perspective side view of the device of FIG. 1 in a closed position.
Figure 5:
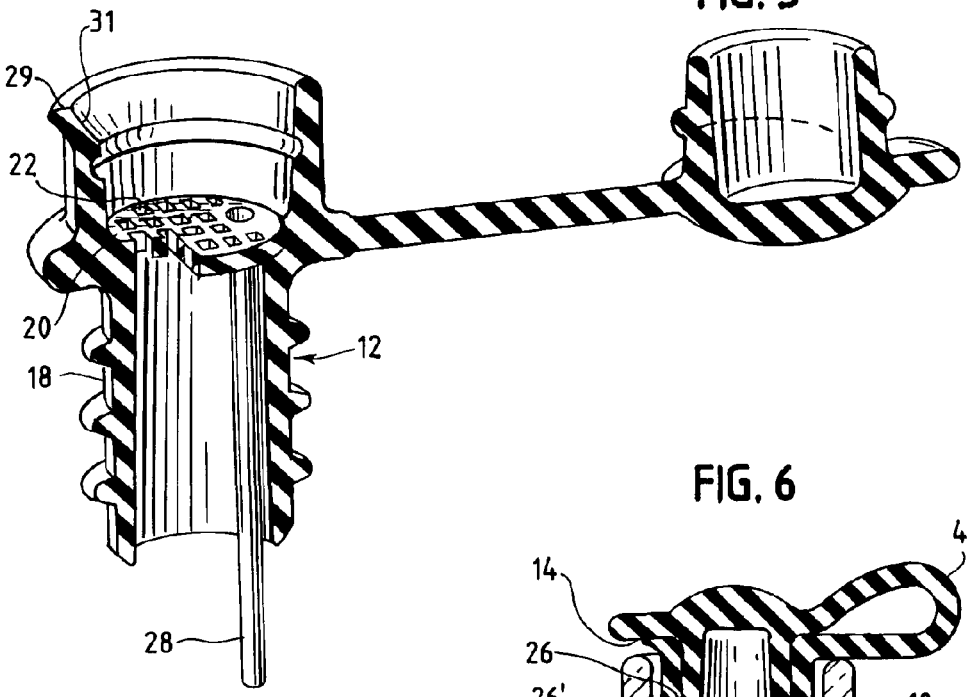
FIG. 5 illustrates a sectional perspective side view of the device of FIG. 1 in an open position.

A single air passageway 28 is provided within the device 10 as shown in FIGS. 1-6 for permitting sufficient air flow from the atmosphere into the bottle when pouring liquid therefrom. This results in a smooth and even flow from the bottle which is aesthetically pleasing. Air passageway 28 is disposed adjacent first cylindrical section 18 and substantially at least the length of first cylindrical section 18 and along the internal periphery of cylindrical body 12. When first end 14 of cylindrical body 12 is inserted into a bottle, air passageway 28 may extend substantially along at least the length of the first cylindrical section 18. Typically, the extension past first end 14 will be as desired, and may be, for example, about 0.50 inches. However, air passageway 28 may be of such a size as to extend to a lower portion of the bottle, and can be seven or eight inches, or more, if desired. On the opposite end, air passageway 28 preferably terminates at the outer surface of filter 20, as shown in FIG. 5, for example.

Air passageway 28 should be large enough in diameter to permit a desired amount of airflow therethrough during pouring. The air passageway permits the flow of air into the bottle while the contents of the bottle are being poured from the bottle. Preferably, the volume of air that will enter air passageway 28 will be equal to the amount of liquid volume flowing through filter 20 during normal pouring so that a smooth pour is achieved. As illustrated, air passageways 28 are circular in cross section although other shapes can be used as desired and are approximately 0.125 inches in diameter.

It is important that air passageway 28 is disposed in the relatively upwardly facing or top position of the bottle when pouring. If the air passageway is not in the upwardly facing position, air passageway 28 may not remain free of the liquid contents of the bottle, thus resulting in an undesirable, uneven flow, since air will be prevented or restricted from entering the bottle during the pouring of liquid therefrom. Often, this uneven flow is characterized additionally by sounds which may be especially distracting and undesirable at a formal event, such as a formal dinner. Further, any uneven flow from the bottle may result in spillage of the contents. Thus, cylindrical body 12 further includes a visual indicator 29 disposed on an outer surface of cylindrical body 12 for identifying the relative location of the air passageway 28 with respect to visual indicator 29. Thus, visual indicator 29 enables the user to identify the location of air passageway 28 and ensure it is in a relatively upwardly facing position of the bottle when pouring.

Visual indicator 29 preferably includes a spout 31 which is disposed on second end 16 and on second cylindrical section 24 of cylindrical body 12 as shown in FIGS. 1-6. However, visual indicator 29 may alternatively comprise a protuberance, an indentation, a marking having a color different from the color of cylindrical body 12, or any other suitable structure for identifying the orientation of air passageway 28 with respect to visual indicator 29. Visual indicator 29 is preferably radially spaced from air passageway 28 by at least 120°, and more preferably by about 180° as shown in FIGS. 1-6, but visual indicator 29 may be radially spaced from the air passageway as desired. For example, visual indicator 29 may be radially spaced from air passageway 28 by about 90°.

Spout 31 is preferably an anti-drip spout (and thus may have a relatively sharp leading edge) which serves a dual purpose of identifying the relative location of air passageway 28 and also preventing any substantial dripping from the bottle stopper device 10 when first cylindrical section 18 is inserted in sealing engagement with bottle B and contents of the bottle B are poured. As shown in FIG. 3, spout 31 preferably measures about 0.580 inches from a top profile centerline width ("W") and a line ("$W_0$") which extends through the top profile outermost point of spout 31 parallel to the top profile centerline width and extends out (an outermost extent) about 0.10 inches more than the outer diameter of second cylindrical section 24 in the absence of spout 31.

Bottle stopper device 10 further preferably includes a cap 36 as shown in FIGS. 1-6. Cap 36 includes a body portion 38 that is cylindrical and complementary to second cylindrical section 24 of cylindrical body 12. Cap 36 includes a sealed top portion 40 having a circumferential shoulder 42 preferably having a rounded edge 42'. A circumferential sealing ring 44 is disposed on the outer surface of cylindrical body portion 38 and is complementary to a circumferential sealing groove 46 located on the interior surface of second cylindrical section 24 of cylindrical body 12. Preferably, circumferential sealing ring 44 is located a desired distance from shoulder 42 so that when cap 36 is inserted into second end 16 of cylindrical body 12, shoulder 42 abuts second end 16, providing a visual indication that circumferential sealing ring 44 is disposed within circumferential sealing groove 46.

Alternatively, circumferential sealing ring 44 could be disposed within second cylindrical section 24 and circumferential sealing groove 46 located on the outer surface of body portion 38 of cap 36.

The combination of circumferential sealing ring 44 and complementary circumferential sealing groove 46 helps ensure a liquid, airtight seal is achieved between cap 36 and cylindrical body 12 when cap 36 is inserted therein as previously described. In addition, the insertion of cap 36 into second end 16 of cylindrical body 12 can provide a tactile, snap-on lock engagement that can be felt by the user when closing device 10 by inserting cap 36 into second end 16. An airtight and leak-proof cap and seal between the circumferential body and the bottle opening is thus provided, eliminating accidental spillage and even permitting the bottle to be stored in a horizontal position. The airtight cap also prevents evaporation and attraction of insects, such as fruit flies. The device is also reusable, and can be easily cleaned.

In an embodiment where visual indicator 29 includes spout 31, it is critical that spout 31 be located above circumferential sealing ring 44 and groove 46 when cap 36 is inserted in second cylindrical section 24 such that the cap is sealed below the spout and no air can enter into the bottle to preserve the content thereof. Cap 36 further includes an overlapping longitudinal extent 50 that overlaps with second end 16 when in sealing engagement therewith to also prevent air from entering into bottle B as shown in FIGS. 1-6. More particularly, spout 31 has a longitudinal extent 52 which is less than the overlapping longitudinal extent 50 of cap 36 such that cap 36 overlaps mouth of spout 31 to prevent air from entering a bottle through spout 31 when the first cylindrical section 18 is in sealing engagement with bottle B and cap 36 is in sealing engagement with the second cylindrical section 24.

Figure 6:
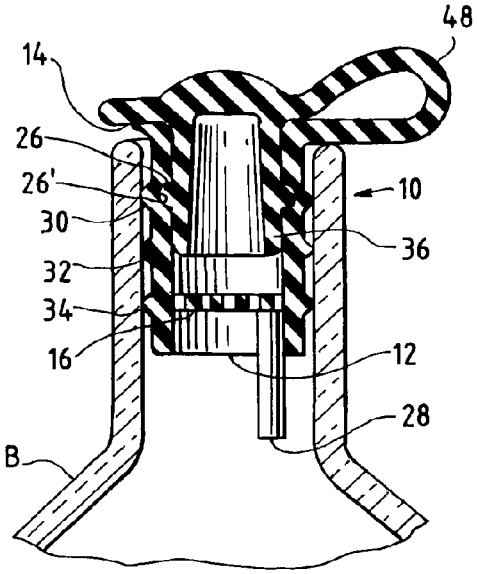
FIG. 6 illustrates a sectional elevation view of the device of FIG. 1 in a closed position.
Figure 7:
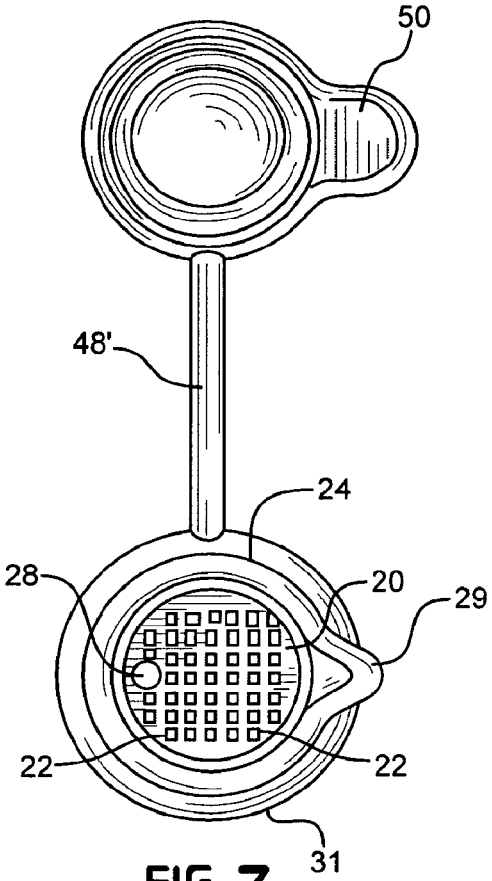
FIG. 7 illustrates a top view of an alternative embodiment of a device in accordance with the present invention.
Figure 8:
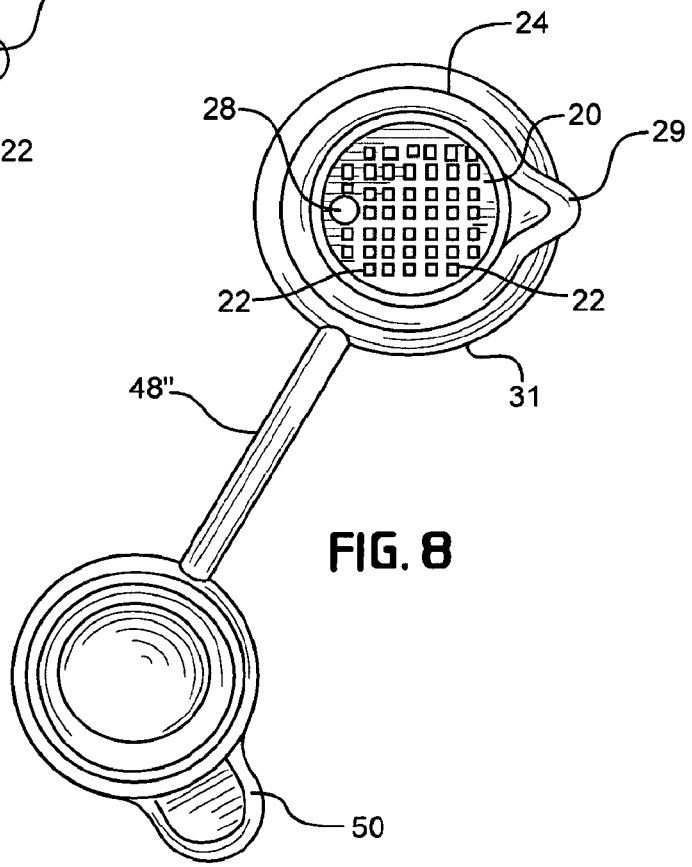
FIG. 8 illustrates a top view of another alternative embodiment of a device in accordance with the present invention.

Cap 36 is preferably integrally formed with cylindrical body 12 and is connected thereto by any suitable structure which may be a strand of flexible material 48 that is the same material as cylindrical body 12, as best illustrated in FIGS. 1-8. Strand 48 is preferably attached to circumferential shoulder 26, as illustrated in the figures and permits cap 36 to be moved between open and closed positions. Additionally, strand 48 is connected to cylindrical body 12 at a predetermined location on the circumference of the cylindrical body 12 and preferably radially spaced about 120° from spout 31, as illustrated in FIG. 8, and more preferably about 180° from spout 31, but strand 48 may be radially spaced from air passageway 28 as desired. Preferably, strand 48 is of sufficient thickness, elasticity, and rigidity such that strand 48 is maintained in a position where strand 48 and cap 36 lie in a horizontal plane below the top horizontal extent of second cylindrical section 24, especially when pouring contents from a bottle. Thus, when liquid is poured from a bottle, strand 48 and cap 36 will not hang in the path where liquid is being poured from the bottle.

Alternatively, strand 48 may be radially positioned about 90° from spout 31, as illustrated in FIG. 7. By positioning of strand 48 at about 90° from spout 31, it is further ensured that strand 48 and cap 36 will not hang in the path where liquid is being poured from the bottle.

Strand 48 will be of sufficient thickness to permit repeated openings and closings of device 10 without breakage. Typically, strand 48 will be circular in cross section, although any shape can be utilized, and will be preferably approximately 0.125 inches in diameter. Strand 48 should be of a sufficient length to readily permit cap 36 to be inserted into second end 16, as illustrated in FIGS. 4-6. Preferably, strand 48 extends from a portion of cylindrical body 12 that is above the part of cylindrical body 12 that is inserted into the end of a bottle.

Stoppers in accordance with the invention can be formed by any suitable method. Injection molding is one particularly suitable method and permits the various elements of the stopper, including the filter to be integrally formed with the other portions of the stopper, including the cap and attaching strand. Any suitable material can be used to make a stopper in accordance with the invention. For example, rubber or resins, natural or synthetic, may be used and should be food compatible or food grade. One such resin is Santoprene® resin.

While the invention has been described with respect to certain preferred embodiments, as will be appreciated by those skilled in the art, it is to be understood that the invention is capable of numerous changes, modifications and rearrangements and such changes, modifications and rearrangements are intended to be covered by the following claims.

The invention claimed is:

1. A pouring device for use with a bottle having a liquid therein, comprising:

a cylindrical body formed of a flexible, elastic, resilient material and having a lower portion terminating at a first end, and an upper portion terminating at a second end, the lower portion having a length and adapted to be inserted into an opening of a bottle in sealing engagement with the bottle and the upper portion having a length, a height and a substantially circular interior cross-sectional shape and disposed adjacent the lower portion for extending above the opening of the bottle when the lower portion is inserted in sealing engagement with the bottle;

a filter including a pour opening composed of a plurality of substantially uniformly disposed apertures, the pour opening extending across substantially an entire substantially circular cross section of the cylindrical body;

an air passageway disposed adjacent to the internal periphery of said lower portion and extending longitudinally beyond the length of said lower portion in a direction away from said upper portion along the internal periphery of said cylindrical body, a portion of the air passageway overlapping the whole length of said filter in the longitudinal direction, the air passageway and the filter being comprised in a unitary body; and a visual indicator disposed on an outer surface of said upper portion *and in the line of a pouring direction that extends from the position of the air passageway generally toward an opposite side of the cylindrical body,* for identifying the relative angular location of said air passageway with respect to said visual indicator *and for identifying the pouring direction*;

the cylindrical body extending above and surrounding the uniformly disposed apertures and the air passageway such that the shape of the upper portion is adapted to permit sealing the liquid in the bottle from the atmosphere by a cylindrical longitudinal extent of a cap insertable into the interior of the upper portion to close both the apertures of the filter and the air passageway to the atmosphere.

2. The device of claim 1 wherein said visual indicator is positioned adjacent the second end and on the upper portion of said cylindrical body.

3. The device of claim 1 wherein said visual indicator comprises a V-shaped pouring spout located on the upper portion.

4. The device of claim 3 wherein said spout comprises a mouth extending outwardly past the cylindrical body and having a slope of about 50 degrees relative to said cylindrical body.

[5. The device of claim 3 wherein said visual indicator is angularly spaced from said air passageway by at least 120°.]

6. [The device of claim 5 wherein said visual indicator is] *A pouring device for use with a bottle having a liquid therein, comprising:*

*a cylindrical body formed of a flexible, elastic, resilient material and having a lower portion terminating at a first end, and an upper portion terminating at a second end, the lower portion having a length and adapted to be inserted into an opening of a bottle in sealing engagement with the bottle and the upper portion having a length, a height and a substantially circular interior cross-sectional shape and disposed adjacent the lower*

*portion for extending above the opening of the bottle when the lower portion is inserted in sealing engagement with the bottle;*

*a filter including a pour opening composed of a plurality of substantially uniformly disposed apertures, the pour opening extending across substantially an entire substantially circular cross section of the cylindrical body;*

*an air passageway disposed adjacent to the internal periphery of said lower portion and extending longitudinally beyond the length of said lower portion in a direction away from said upper portion along the internal periphery of said cylindrical body, a portion of the air passageway overlapping the whole length of said filter in the longitudinal direction, the air passageway and the filter being comprised in a unitary body; and*

*a visual indicator disposed on an outer surface of said upper portion for identifying the relative angular location of said air passageway with respect to said visual indicator;*

*the cylindrical body extending above and surrounding the uniformly disposed apertures and the air passageway such that the shape of the upper portion is adapted to permit sealing the liquid in the bottle from the atmosphere by a cylindrical longitudinal extent of a cap insertable into the interior of the upper portion to close both the apertures of the filter and the air passageway to the atmosphere;*

*said visual indicator comprising a V-shaped pouring spout located on the upper portion, the V-shaped spout being* angularly spaced from said air passageway about 180°.

7. The device of claim 3 wherein the plurality of apertures each have an interior cross-sectional dimension of about 0.04 inches or less, and wherein said filter is disposed within and integrally formed within said cylindrical body.

8. The device of claim 7 wherein the filter is of the same material as the cylindrical body.

9. The device of claim 3 further comprising an attached cap insertable at the second end in sealing engagement with the interior of the upper portion of said cylindrical body, said attached cap having a cylindrical overlapping longitudinal extent that overlaps with the second end when in sealing engagement the interior of the upper portion, said attached cap being attached to an upper portion of said cylindrical body by a strand of flexible material extending from the cylindrical body to the cap, and wherein the spout has a longitudinal extent less than the overlapping longitudinal extent of the attached cap, the strand extending from the upper portion of the cylindrical body being the visual indicator for identifying the relative angular location of said air passageway.

10. The device of claim 9, further comprising an integral circumferential sealing ring on one of the cap and the interior of the cylindrical body and, on the other of the cap and cylindrical body, a circumferential sealing groove complementary to the sealing ring, the spout being located above the circumferential sealing ring and groove when the cap is inserted into the interior of the upper portion to align the circumferential sealing ring and groove.

11. The device of claim 10 wherein the circumferential sealing ring is on the cap.

12. The device of claim 9 wherein the cap is attached to said cylindrical body by a flexible, elongated, cylindrical strand of material having an at least substantially uniform and at least substantially circular cross section, extending from the cylindrical body to the cap at a predetermined location on the circumference of the cylindrical body.

13. The device of claim 12, wherein:

the air passageway is angularly spaced 180° from the spout;

the strand is attached to the cylindrical body at a first end of the strand at a location angularly spaced 180° from the spout;

the strand is attached to the cap at a second end of the strand;

when the cap is inserted in sealing engagement with the interior of the second end of the cylindrical body, the first and second ends of the strand are spaced apart from each other a distance of about the height of the upper portion in a generally longitudinal direction; and when liquid is poured from a bottle in which the device is inserted, the strand is of sufficient thickness and rigidity to prevent the strand and cap from hanging in the path where liquid is being poured from the bottle.

14. The device of claim 13, the height of the upper portion being about 0.75 inch.

15. The device of claim 9 wherein the cap is integrally attached to the cylindrical body.

16. The device of claim 15 wherein the cap is integrally attached to the cylindrical body by a flexible, elongated, cylindrical strand of material.

17. The device of claim 12 wherein the attachment of the cylindrical strand at a predetermined location on the cylindrical body.

[18. The device of claim 12 wherein the predetermined location is angularly spaced at least about 120° from the spout.]

19. The device of claim 1 wherein said visual indicator comprises a protuberance.

20. The device of claim 1 wherein said visual indicator comprises a marking having a color different from the color of said cylindrical body.

21. The device of claim 1 wherein said air passageway is substantially encircled by said plurality of apertures.

22. The device of claim 1, the lower portion further adapted to be inserted in a longitudinal direction into the opening of a wine bottle and further comprising a circumferential sealing ring adapted to deform to provide sealing engagement with the wine bottle.

23. A method of pouring a liquid from a bottle comprising:

inserting a pouring device into a bottle, said pouring device comprising:

a cylindrical body formed of a flexible, elastic, resilient material and having a lower portion at a first end, and an upper portion at a second end, the lower portion having a length and adapted to be inserted into an opening of a bottle in sealing engagement with the bottle and the upper portion having a length and a substantially circular interior cross-sectional shape and disposed adjacent the lower portion for extending above the opening of the bottle when the lower portion is inserted in sealing engagement with the bottle;

a filter including a pour opening composed of a plurality of substantially uniformly disposed apertures, the pour opening extending across substantially an entire substantially circular cross section of the cylindrical body;

an air passageway disposed adjacent to the internal periphery of said lower portion and extending longitudinally beyond the length of said lower portion in a direction away from said upper portion along the internal periphery of said cylindrical body, a portion of the air passageway overlapping the whole length of said filter in the longitudinal direction, the air passageway and the filter being comprised in a unitary body; and a visual indicator disposed on an outer surface of said upper portion *and in the line of a pouring direction that extends through the position of the air passageway generally toward an opposite side of the cylindrical body,* for identifying the relative angular location of said air passageway with respect to said visual indicator *and for identifying the pouring direction*;

the cylindrical body extending above and surrounding the uniformly disposed apertures and the air passageway such that the shape of the upper portion is adapted to permit sealing the liquid in the bottle from the atmosphere by a cylindrical longitudinal extent of a cap insertable into the interior of the upper portion to close both the apertures of the filter and the air passageway to the atmosphere;

verifying a location on said cylindrical body of said visual indicator and the relative location of said air passageway relative to said visual indicator;

orienting the bottle so that when the bottle is tilted in a downward direction for pouring the air passageway will be in a relatively upward facing position; and pouring contents from said bottle by tilting the bottle in the downward direction such that the air passageway of said bottle stopper device is maintained in a relatively upward facing position.

24. The method according to claim 23 wherein the verifying a location on said cylindrical body includes verifying the location of a spout.

25. The method according to claim 23 wherein said air passageway is substantially encircled by said plurality of apertures.

26. A method for manufacturing a pouring device for use with a bottle comprising:

integrally forming the pouring device by:

forming a cylindrical body formed of a flexible, elastic, resilient material and having a lower portion at a first end, and an upper portion at a second end;

forming the lower portion with a length, the lower portion adapted to be inserted into an opening of a bottle in sealing engagement with the bottle;

forming the upper portion with a length and a substantially circular interior cross-sectional shape and disposing the upper portion adjacent the lower portion such that the upper portion extends above the opening of the bottle when the lower portion is inserted in sealing engagement with the bottle;

forming the cylindrical body with a filter including a pour opening composed of a plurality of substantially uniformly disposed apertures, the pour opening extending across substantially an entire substantially circular cross section of the cylindrical body;

forming an air passageway disposed adjacent the internal periphery of said lower portion and extending longitudinally along substantially at least the length of said lower portion and along the internal periphery of said cylindrical body, a portion of the air passageway being integrally formed with and at least coextensive with said filter in the longitudinal direction;

forming a visual indicator disposed on an outer surface of said upper portion *and in the line of a pouring direction that extends through the position of the air passageway generally toward an opposite side of the cylindrical body,* for identifying the relative angular location of said air passageway with respect to said visual indicator *and for identifying the pouring direction*;

integrally forming a cap having a cylindrical longitudinal extent adapted to be inserted into the lower portion to seal both the air passageway and the apertures of the filter to the atmosphere and a longitudinally elongated strand of flexible material that are connected to the upper portion of the cylindrical body by the strand; and integrally forming a V-shaped spout connected to the upper portion of the cylindrical body and wherein the strand is an elongated cylindrical strand and is connected to the body at a location angularly spaced from the spout.

27. The method according to claim 26 wherein forming said visual indicator includes providing the spout.

28. The method according to claim 26 wherein said air passageway is substantially encircled by said plurality of apertures.

29. The method of claim 26 wherein the radial spacing of the strand from the spout is 180°.

[30. The method of claim 26 wherein the radial spacing of the strand from the spout is 90°.]

[31. The method of claim 26 wherein the radial spacing of the strand from the spout is 120°.]

32. The method of claim 26, wherein:

the strand is attached to the cylindrical body at a first end of the strand;

the strand is attached to the cap at a second end of the strand;

when the cap is inserted in sealing engagement with the interior of the second end of the cylindrical body, the first and second ends of the strand are spaced apart from each other in a generally longitudinal direction with respect to the cylindrical body, and the strand extends in a generally circular arc from the first end of the strand to the second end of the strand.

33. The method of claim 26 wherein the spout has a rim that lies at least substantially in a horizontal plane; and the cap further including a radially extending, generally planar tab adapted to overlap the rim of the spout to close the spout to the atmosphere when the cap is inserted in sealing engagement with the interior of the second end of the cylindrical body.

34. The method of claim 33, the rim of the spout being at least substantially coplanar with the second end, further comprising forming on the cap a circumferential shoulder at least substantially coplanar with the tab, the circumferential shoulder overlapping the second end when the tab overlaps the rim of the spout to close the second end to the atmosphere.

35. The method of claim 26, the strand having an at least substantially uniform and at least substantially circular cross section.

36. The method of claim 26, further comprising forming the entire device by injection molding.

37. The method of claim 26, further comprising forming on the lower portion a first circumferential sealing ring adapted to be deformed to provide sealing engagement with the interior of a wine bottle when the device is inserted into the wine bottle.

38. The method of claim 37, further comprising forming on the lower portion a second circumferential sealing ring adapted to be deformed to provide sealing engagement with the interior of a wine bottle when the device is inserted into the wine bottle, the second circumferential sealing ring longitudinally spaced apart from the first circumferential sealing ring.

39. The method of claim 26, further comprising forming on the cylindrical body a circumferential shoulder adapted to abut the top edge of a wine bottle into which the lower portion is inserted to visually indicate that the lower portion is inserted into the wine bottle.

*40. A pouring device for use with a bottle having a liquid therein, comprising:*

*a cylindrical body formed of a flexible, elastic, resilient material and having a lower portion terminating at a lower end, and an upper portion terminating at an upper end, the lower portion having a length and adapted to be inserted into an opening of a bottle in sealing engagement with the bottle and the upper portion having a length, a height and a substantially circular interior cross-sectional shape and disposed adjacent the lower portion for extending above the opening of the bottle when the lower portion is inserted in sealing engagement with the bottle;*

*a pouring passageway extending longitudinally through the interior of the cylindrical body;*

*an air passageway disposed adjacent to the internal periphery of said lower portion and extending along the internal periphery of said cylindrical body at least to the lower end of said cylindrical body;*

*an attached cap having a longitudinal portion insertable into the interior of the upper portion, the cap configured to seal the liquid in the bottle and close the air passageway to the atmosphere when the longitudinal portion is inserted, and the cap including a generally planar peripheral flange contacting and overlapping at least substantially an entire generally planar upper rim of the upper portion when the cap is inserted into the interior of the upper portion to close the upper portion to the atmosphere; and*

*an elongate, flexible strand attached at a first end to the cap and at a second end to the cylindrical body, the end of the strand attached to the cylindrical body being located at approximately the angular position of the air passageway to provide a visual indicator of the position of the air passageway,*

*the generally planar upper rim of the upper portion including a generally planar upper rim of a pour spout protruding radially from an upper end of the upper portion.*

*41. The pouring device of claim 40, the insertable longitudinal portion of the cap being generally cylindrical.*

*42. The pouring device of claim 40, the cylindrical body further comprising a circumferential shoulder at an upper end of the lower portion, and a sealing ring disposed on the outer surface of the lower portion, the circumferential shoulder adapted to abut the top edge of a wine bottle into which the lower portion is inserted, the sealing ring located below the shoulder portion and adapted to deform to sealingly engage an interior surface of a wine bottle into which the lower portion is inserted, at least a portion of each of the cap, strand, shoulder portion, and sealing ring being comprised in an integrally formed body of resilient material.*

* * * * *